United States Patent
Ishikawa

[11] Patent Number: 5,859,936
[45] Date of Patent: Jan. 12, 1999

[54] OPTICAL BEAM SPLITTING DEVICE AND METHOD OF CONTROLLING OPTICAL BEAM OUTPUTS

[75] Inventor: Tomohisa Ishikawa, Kawasaki, Japan

[73] Assignee: Fujitsu Limited, Kawasaki, Japan

[21] Appl. No.: 915,932

[22] Filed: Aug. 21, 1997

[30] Foreign Application Priority Data

Feb. 24, 1997 [JP] Japan .................................. 9-039064

[51] Int. Cl.⁶ .................................................. G02F 1/295
[52] U.S. Cl. .............................................. 385/4; 359/161
[58] Field of Search .................................. 385/4, 5, 7, 8, 385/15, 16, 18, 24, 27, 147; 359/187, 110, 161, 152, 191; 372/20, 32; 356/369; 250/225; 369/48, 54, 58, 106, 111, 116, 124

[56] References Cited

U.S. PATENT DOCUMENTS

| | | | |
|---|---|---|---|
| 4,956,702 | 9/1990 | McQuade et al. | 347/232 |
| 5,247,382 | 9/1993 | Suzuki | 359/156 |
| 5,253,309 | 10/1993 | Nazarathy et al. | 385/4 |
| 5,696,859 | 12/1997 | Onaka et al. | 385/24 |

OTHER PUBLICATIONS

Japanese Patent Abstract No. 3–06504, published (Jan. 14, 1991).

*Primary Examiner*—Akm E. Ullah
*Attorney, Agent, or Firm*—Staas & Halsey

[57] ABSTRACT

An optical beam splitting device which selectively disables a faulty output port to stop further emission of the optical beam therefrom. When an optical fiber cable is broken or a cable plug is disconnected, some part of the optical beam is reflected at the fiber end face that is left open. An optical sensing device, such as a photodiode, equipped in the beam splitting device receives this reflected light and transduces it into an electrical signal. A reflection detection controller examines this electrical signal and recognizes the presence of the back reflection if the electrical signal exceeds a predetermined reference level. The reflection detection controller then sends a beam control signal to an external modulator disposed at that faulty output port. With the beam control signal, the external modulator varies the intensity of the light beam so that only a limited power will be delivered to the faulty port where the back reflection is observed.

9 Claims, 18 Drawing Sheets

OPTICAL BEAM SPLITTING DEVICE AND METHOD OF CONTROLLING OPTICAL BEAM OUTPUTS

BACKGROUND OF THE INVENTION

1. Field of the Invention

The present invention relates to an optical beam splitting device and a method of controlling optical beam outputs. More particularly, the present invention relates to an optical beam splitting device that divides an optical beam into a plurality of beams and provides them to a plurality of output ports. The present invention further relates to a method of controlling a plurality of optical beam outputs of an optical beam splitting device.

2. Description of the Related Art

Optical communications technologies have been rapidly brought into the fields of local area networks (LANs) and subscriber telecommunication systems these days. To integrate a highly organized network by using fiber optics, there are increasing demands for optical branching devices that provide connection, division, combination, and other functions to distribute optical beams.

Beam splitters, among the optical branching devices, are optical devices that divide an input light signal into a plurality of separate beams and output them through their respective output ports. Besides being designed to provide this basic feature, some beam splitters are equipped with such a control function that shuts off the output or reduces the output power for safety purposes, when one of the output ports gets open-ended. More specifically, when a fiber optic cable is broken or a cable plug has happened to be removed from optical communication equipment, the network connection is interrupted and a maintenance engineer will be called to solve the problem. During the service, he/she is potentially exposed to a hazardous environment where a light beam is emitted from the open end of the broken cable or from the unplugged receptacle on the equipment, and if the direct beam impinged on his/her eye, it could cause an injury to the retina. The above safety function protects his/her eyes from such a hazard.

FIG. 18 is a block diagram of a beam splitter 100 equipped with a conventional beam output control function. This beam splitter 100 divides a single input light beam amplified by an optical amplifier 120 into eight beams to distribute them through their respective output ports A–H. In the case of cable breaks or plug disconnection, some part of the light beam is reflected at a fiber end face that is left open.

Suppose that such a back reflection has happened to the output port A, for instance. A photodiode PD1 receives the reflected light and transduces it to an electrical signal. A detector 101 examines the voltage level of the electrical signal sent from the photodiode PD1, and if the voltage level exceeds a predetermined reference level, the detector 101 will generate a detection signal indicating the presence of a meaningful back reflection. Upon receipt of this detection signal, an optical amplifier controller 111 sends a control signal to the optical amplifier 120 to stop the emission of the amplified beam or reduce its output power level. Note the above operation will be performed by other components shown in FIG. 18, i.e., photodiodes PD2–PD4, detectors 102–104, and optical amplifier controllers 112–114, if they encountered the same problem.

In the conventional beam splitter 100 outlined above, however, the reflected light detected in one port will affect the beam outputs of all the ports. This disrupts all communication services having been provided to the subscribers involved and thus leads to an extensive degradation in the quality of optical communication services.

SUMMARY OF THE INVENTION

Taking the above into consideration, a first object of the present invention is to provide an optical beam splitting device that controls the optical power level of a faulty port exclusively.

A second object of the present invention is to provide a method of controlling optical beams produced by an optical beam splitter, where optical power level of a faulty port can be controlled separately from other ports.

To accomplish the first object, according to the present invention, there is provided an optical beam splitting device for dividing an input optical beam into a plurality of optical beams and outputting the plurality of optical beams through output ports assigned thereto. This optical beam splitting device comprises an optical sensing device, a reflection detection controller, and an external modulator. The optical sensing device receives a reflected light that is reflected at a fiber end face and returns through one of the output ports, and it converts the reflected light into an electrical signal. The reflection detection controller detects the reflected light by examining whether the electrical signal exceeds a predetermined reference level or not, and generates a beam control signal upon detection of the reflected light. In response to the beam control signal, the external modulator reduces intensity of the optical beam that is supplied to the output port through which the reflected light has returned.

To accomplish the above second object, there is provided a method of controlling optical beams produced by an optical beam splitter that divides an input optical beam into a plurality of optical beams and outputs the plurality of optical beams through output ports assigned thereto.

This method comprises the steps of: (a) converting a reflected light into an electrical signal, wherein the reflected light is reflected at a fiber end face and returns through one of the output ports; (b) detecting the reflected light by examining whether the electrical signal exceeds a predetermined reference level or not; (c) generating beam control signals for the individual output ports upon detection of the reflected light; (d) in response to the beam control signals, reducing power level of the optical beam for each output port to examine whether the reflected light disappears or not; and (e) restoring the optical beam for the output port if the reflection light is alive, and maintaining the optical beam with the reduced power level if the reflected light disappeared in said step (d) of reducing the optical beam.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Several embodiments of the present invention will be described below with reference to the accompanying drawings.

Figure 1:
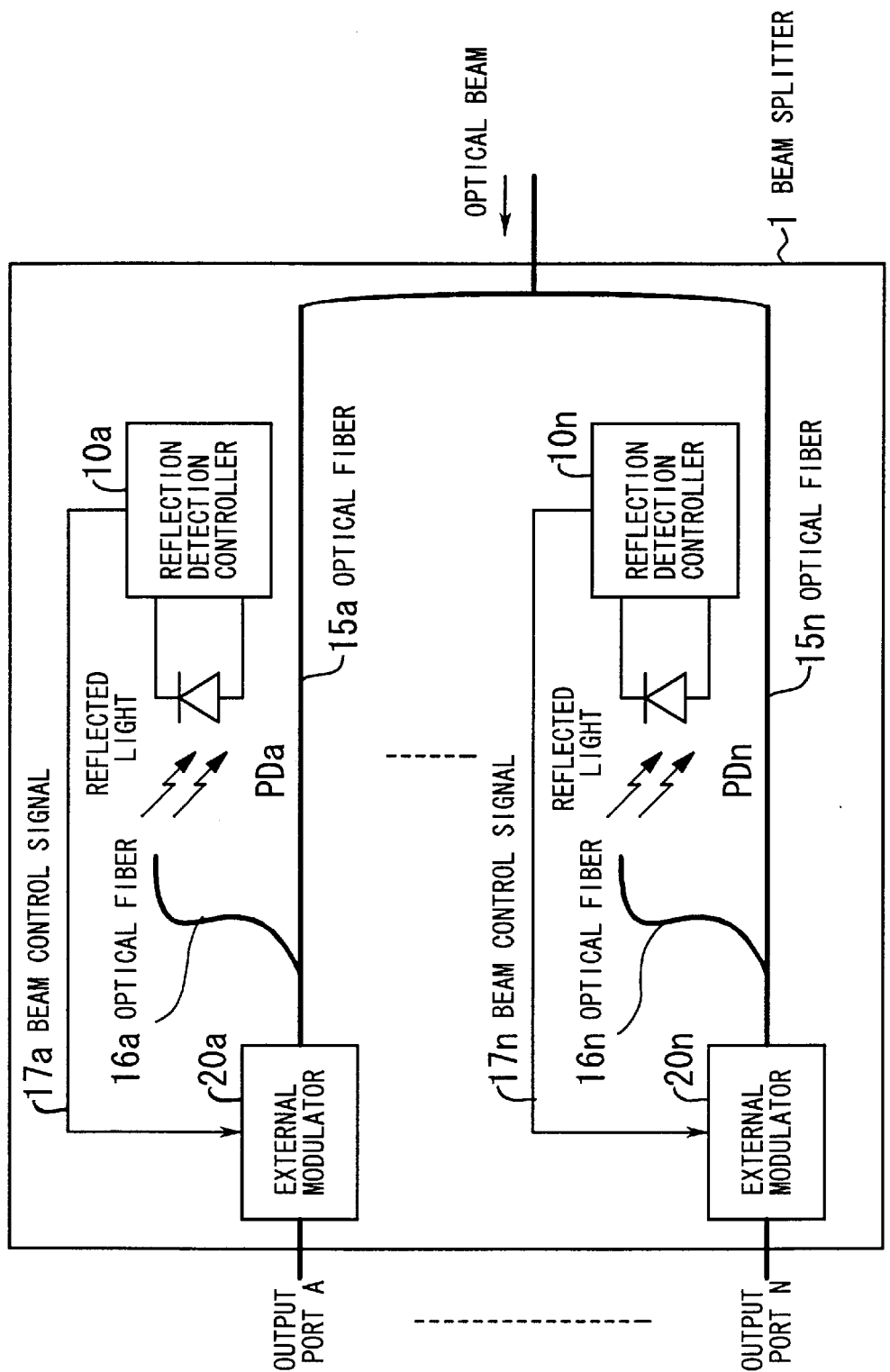
FIG. 1 is a conceptual view of an optical beam splitting device in which the present invention is implemented as a first embodiment.

FIG. 1 is a conceptual view of an optical beam splitting device in which the present invention is implemented as a first embodiment. A beam splitter 1 is an optical component that divides a single input optical beam into a plurality of separate beams and outputs them through their respective output ports A–N.

More specifically, this beam splitter 1 comprises external modulators 20a–20n disposed at the output ports A–N, respectively. The divided light beams are conveyed by optical fibers 15a–15n serving as main optical paths and pass through the external modulators 20a–20n before reaching the output ports A–N. From the optical fibers 15a–15n, additional optical paths 16a–16n branch off in the backward direction, whose extreme ends are facing photodiodes PDa–PDn, respectively. The photodiodes PDa–PDn, serving as optical sensing devices, are connected to the front-end circuits of reflection detection controllers 10a–10n.

In case of a trouble such as a cable brake or plug disconnection, some part of the output light beam will be reflected at the fiber end face that is left open. Assume here that such a trouble has happened to the output port A, for instance. The reflected light passes through the external modulator 20a and then arrives at the photodiode PDa via the additional optical path 16a. The photodiode PDa transduces the reflected light into an electrical signal. The reflection detection controller 10a compares this electrical signal with a predetermined reference level. More specifically, if the voltage of the electrical signal exceeds the reference level, the reflection detection controller 10a recognizes the presence of a light reflection and thus generates a beam control signal 17a. On the other hand, if the voltage is not higher than the reference level, the reflected light is neglected, and thus the beam control signal 17a stays inactive. Upon receipt of the beam control signal 17a, the external modulator 20a varies the intensity of the light beam so that only a limited power will be supplied to the faulty port where the back reflection is detected.

Although the above explanation assumes that the output port A is faulty, other output ports will work just similarly if they encountered the same problem.

Figure 2:
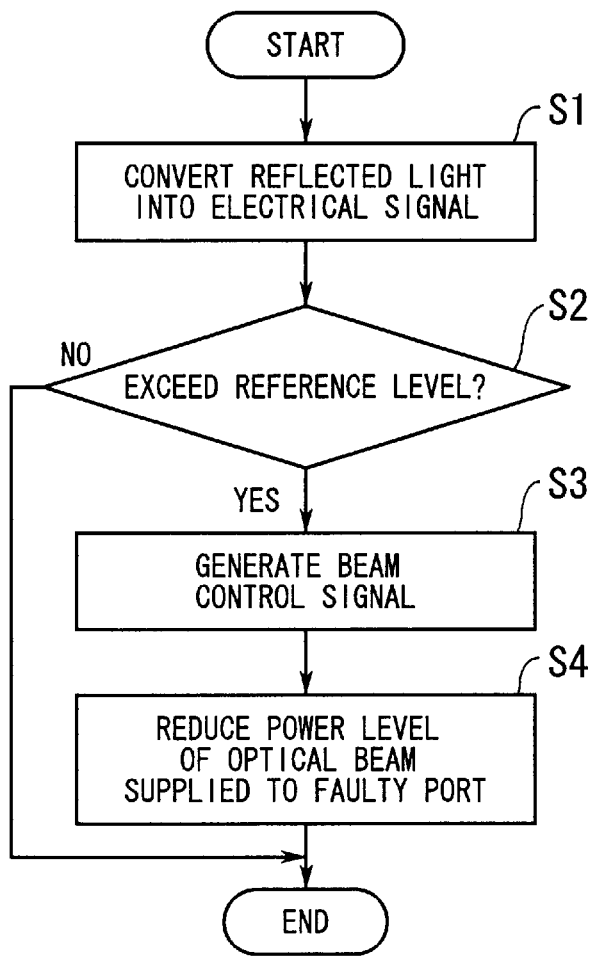
FIG. 2 is a flowchart showing an operation sequence of the beam splitting device of the first embodiment.

FIG. 2 shows the operation of the beam splitter 1 in the form of flowchart, which illustrates a process comprising four steps S1 to S4, assuming that the output port A is faulty.

[S1] The photodiode PDa receives a light beam reflected at a fiber end face and transduces it into an electrical signal.

[S2] The reflection detection controller 10a examines whether the voltage of the electrical signal exceeds a predetermined reference level or not. If it exceeds the reference level, the process advances to step S3. Otherwise, the process is terminated.

[S3] Having recognized the presence of the light reflection, the reflection detection controller 10a activates the beam control signal 17a.

[S4] With the beam control signal 17a, the external modulator 20a varies the intensity of the light beam so that only a limited power will be delivered to the faulty port where the reflection is observed.

As described above, the beam splitter 1 of the first embodiment produces a beam control signal by transducing a reflected light to an electrical signal, and according to this beam control signal, it reduces the output power level of the faulty output port. Since the output control is applied on a port-by-port basis, normal output ports can continue to operate while the faulty port is disabled solely. Therefore, the optical communications network can maintain its quality of service, minimizing the effect of a local problem pertaining to a cable connection.

Figure 3:
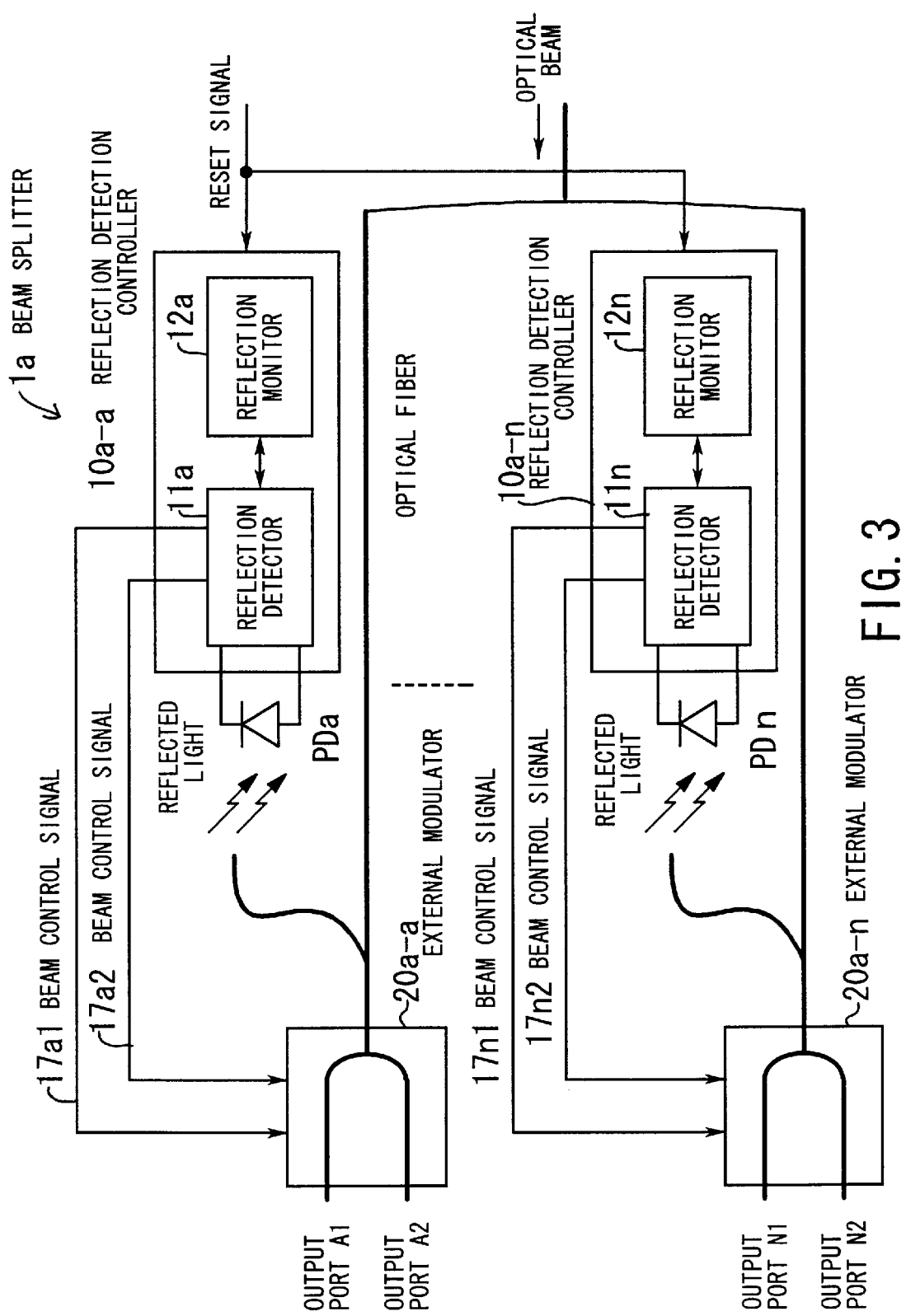
FIG. 3 is a block diagram showing a specific structure of a beam splitter of the first embodiment.

Referring next to FIG. 3, the following will present a more specific structure of the first embodiment outlined above. FIG. 3 is a block diagram of a beam splitter 1a of the first embodiment, which employs external modulators 20a-a to 20a-n. These external modulators 20a-a to 20a-n are single-input dual-output modulators each capable of modulating the strength of two output beams independently of each other. FIG. 3 shows that the external modulator 20a-a provides ports A1 and A2, and the external modulator 20a-n provides ports N1 and N2, while other ports and external modulators are omitted due to the space limitation of FIG. 3. For simplicity, the following description will discuss only a limited portion related to the output ports A1 and A2, assuming that the port A2 has encountered a problem. The remaining portions would operate just similarly, if the same problem happened to them.

When a cable break or plug disconnection has occurred to a fiber optic cable extended from the output port A2, the light reflected at the fiber end face returns to the beam splitter 1a and reaches the photodiode PDa after passing through the external modulator 20a-a. The photodiode PDa converts this reflected light to an electrical signal.

This electrical signal enters to a reflection detection controller 10a-a, which comprises a reflection detector 11a and a reflection monitor 12a. The reflection detector 11a compares the voltage of the electrical signal with a predetermined reference voltage level, and if the voltage exceeds the reference level, it recognizes the presence of the light reflection, thus outputting two beam control signals 17a1 and 17a2. Both beam control signals 17a1 and 17a2 are applied to the external modulator 20a-a to vary the beam intensity of the output ports A1 and A2, respectively.

The reflection monitor 12a monitors the status of the light reflection detected by the photodiode PDa. When the external modulator 20a-a reduces the optical beam intensity of the output port A1 and A2, the reflection monitor 12a checks whether the reflection disappears or not, so as to determine which port is faulty. If the faulty output port is successfully determined, the reflection monitor 12a commands the reflection detector 11a to keep the beam control signals 17a1 and 17a2 so that only the faulty port will receive that signal. With the beam control signal 17a1 or 17a2 selectively activated by the reflection detector 11a, the external modulator 20a-a varies the intensity of the light beam so that only a limited power will be delivered to the faulty port where the back reflection was observed.

When the problem of cable break or plug disconnection is solved by a maintenance engineer, a reset signal can be entered from an external signal source to the reflection detection controller 10a-a. This external reset signal initializes both reflection detector 11a and reflection monitor 12a, thereby deactivating the beam control signals 17a1 and 17a2. Accordingly, the external modulator 20a-a returns to its original state.

Figure 4:
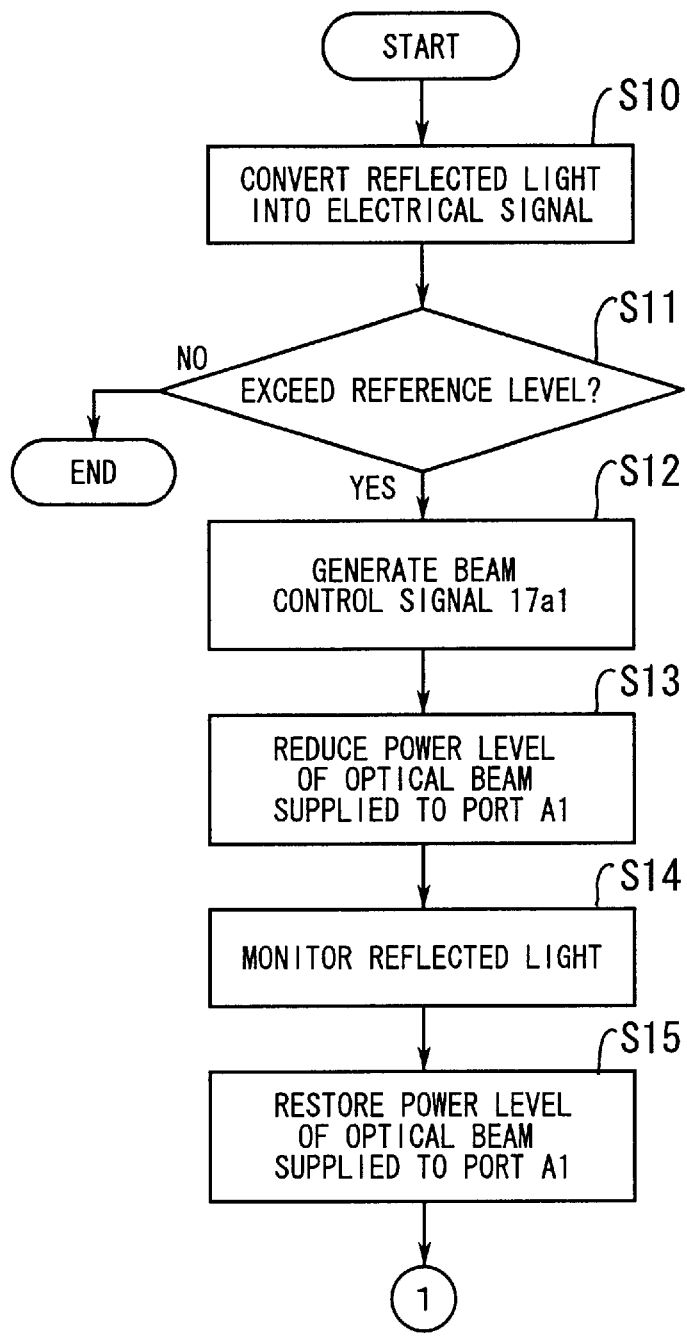
FIGS. 4 and 5 are flowcharts showing an operation sequence of the beam splitter of the first embodiment.
Figure 5:
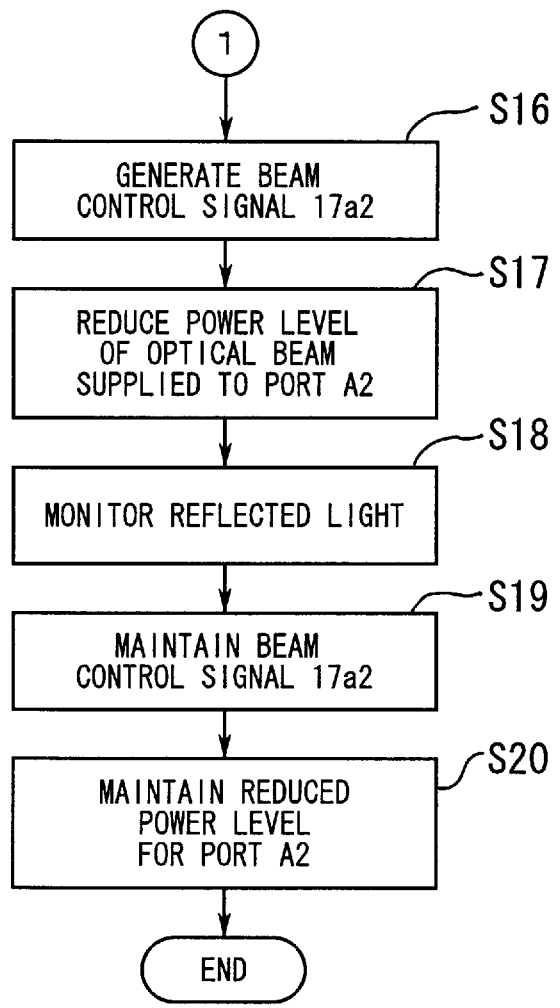

FIGS. 4 and 5 represent the operation of the beam splitter 1a of the first embodiment in the form of a flowchart, where the output port A2 is assumed to be faulty. The process comprises the following steps, S10 to S20.

[S10] The photodiode PDa receives a light beam reflected at a fiber end face and transduces it into an electrical signal.

[S11] The reflection detector 11a examines whether the voltage of the electrical signal exceeds a predetermined reference level or not. If it exceeds the reference level, the process advances to step S12. Otherwise, the process is terminated.

[S12] Having recognized the presence of a back reflection, the reflection detector 11a activates a beam control signal 17a1.

[S13] With the beam control signal 17a1, the external modulator 20a-a controls the intensity of the optical beam of the output port A1 so that only a limited power will be delivered thereto.

[S14] The reflection monitor 12a checks whether the reflection has disappeared or not. Because the reflected light comes from the output port A2 in this case, the reflection is still observed by the reflection detector 11a even if the power of the output port A1 is reduced. Accordingly, the reflection monitor 12a determines that the output port A1 is functioning normally.

[S15] By negating the beam control signal 17a1, the external modulator 20a-a controls the intensity of the light beam of the output port A1 so that the normal power level will be regained.

[S16] The reflection detector 11a activates another beam control signal 17a2.

[S17] With the beam control signal 17a2, the external modulator 20a-a varies the optical beam intensity of the output port A2 so that only a limited power will be delivered thereto.

[S18] The reflection monitor 12a checks whether the reflection has disappeared or not. Because of the reflected light originated in the output port A2 in this case, the reflection is no longer observed by the reflection detector 11a, and therefore, the reflection monitor 12a determines that the output port A2 is faulty.

[S19] The reflection monitor 12a controls the reflection detector 11a to keep the present setting of the beam control signals 17a1 and 17a2 by which the external modulator 20a-a only reduces the output power of the faulty port A2.

[S20] Based on the beam control signal 17a2 that is solely activated, the external modulator 20a-a keeps reducing the output power of the faulty port A2.

Figure 6:
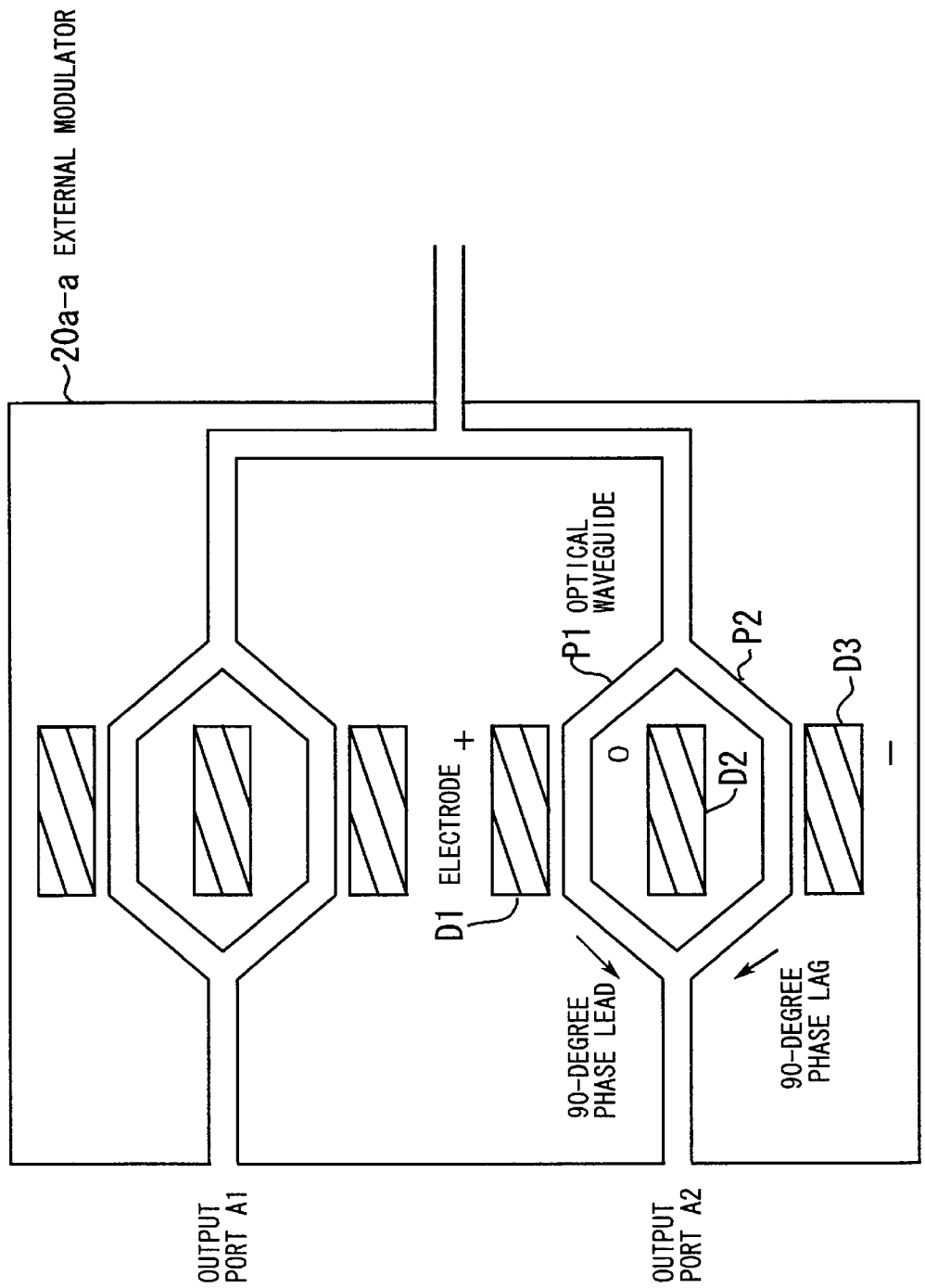
FIG. 6, is a diagram showing a typical internal structure of an external modulator used in the first embodiment.

Next, the following description explains the internal structure of the external modulators used in the beam splitter 1a. FIG. 6 shows a typical internal structure of the external modulator 20a-a. The external modulator 20a-a comprises two Mach-Zehnder phase-modulator-type 1×1 waveguide-based photonic switches, one for each output port, A1 and A2, which cause some amount of phase shifts (lag and lead) to two input light beams and superimpose the two phase-shifted beams.

See the output port A2 illustrated in FIG. 6. The input waveguide on the right hand of FIG. 6 branches out in two directions: one optical waveguide P1 running through the gap between two electrodes D1 and D2, and the other optical waveguide P2 running through the gap between electrodes D2 and D3. The two optical waveguides P1 and P2 meet again and combined into one waveguide as the output port A2.

Assume here that the output port A2 has turned out to be faulty and the beam control signal 17a2 is thus activated. Then a positive and negative voltages are applied respectively to the electrodes D1 and D3, with respect to the electrodes D2 having the reference potential, namely, zero volts. As a result, the optical waveguides P1 and P2 are exposed in the electrical fields produced by the voltages applied to the electrodes D1-D3. The optical signal coming out from the optical waveguide P1 is advanced by 90 degrees in phase and the other from the optical waveguide P2 is delayed by 90 degrees, thus making the two optical signals have opposite phases to each other. When they meet at the combined ends of the waveguides P1 and P2, they balance each other out and thus the total output decreases or completely disappears. On the other hand, the incoming optical signal will pass through the optical waveguides P1 and P2 without attenuation in normal situations where no voltages are applied to the electrodes D1-D3.

As described above, the beam splitter 1a of the first embodiment produces beam control signals by transducing a reflected light beam into an electrical signal, sequentially reduces the power level of the output ports by activating the beam control signals one by one, and if the reflection disappears, determines the port as being faulty. Since the output control is applied on an individual port basis, normal ports can continue to operate while the faulty port is closed. Therefore, the optical communications network can maintain its quality of service, minimizing the effect of a local problem pertaining to a cable connection.

When the problem of cable break or plug disconnection has been solved by a maintenance engineer, a reset signal can be entered from an external signal source to the reflection detection controller 10a-a. This external reset signal resets the reflection detection controller 10a-a to deactivate the beam control signals, thereby allowing the external modulator 20a-a to return to its normal state.

Figure 7:
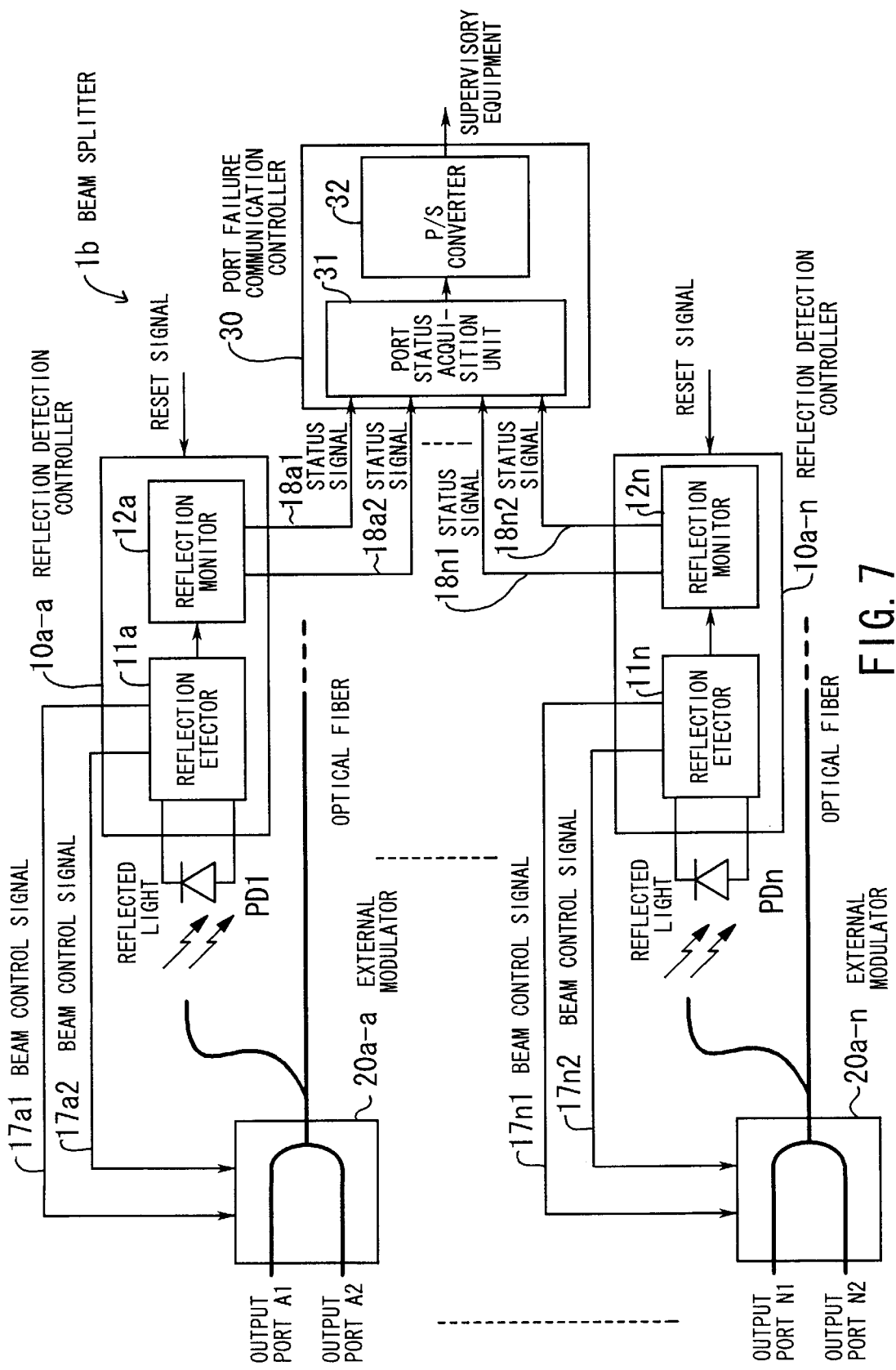
FIG. 7 is a block diagram showing an alternate arrangement of the first embodiment.

Referring next to FIG. 7, the following will present an alternate arrangement of the first embodiment of the present invention. FIG. 7 is a block diagram of another beam splitter 1b, which is based on the beam splitter 1a of the first embodiment but additionally equipped with a port failure communication controller 30 that reports the error status information to an external alarm device. The following will not repeat explanation about the structural elements other than the port failure communication controller 30 in FIG. 7 since they are common to the beam splitter 1a.

The port failure communication controller 30 comprises a port status acquisition unit 31 and a parallel-to-serial (P/S) converter 32. The port status acquisition unit 31 receives status signals 18a1, 18a2, . . . , 18n1, and 18n2 from the reflection monitors 12a–12n. By collecting these status signals, the port status acquisition unit 31 forms a status code, each bit of which indicates whether the corresponding output port is operating normally or not. More specifically, when one status bit corresponding to a particular output port is set to "0," it indicates that the port is working properly. When in turn it is set to "1," the output port is regarded as a faulty port.

The P/S converter 32 converts this parallel status code into a serial bit stream and sends it to external supervisory equipment such as alarm devices or safety appliances.

As described above, the beam splitter 1b of the alternate first embodiment comprises the port failure communication controller 30 to inform external supervisory equipment of the faulty port if it is detected. This configuration allows the maintenance engineers to know the faulty port easily and to perform troubleshooting more quickly.

Figure 8:
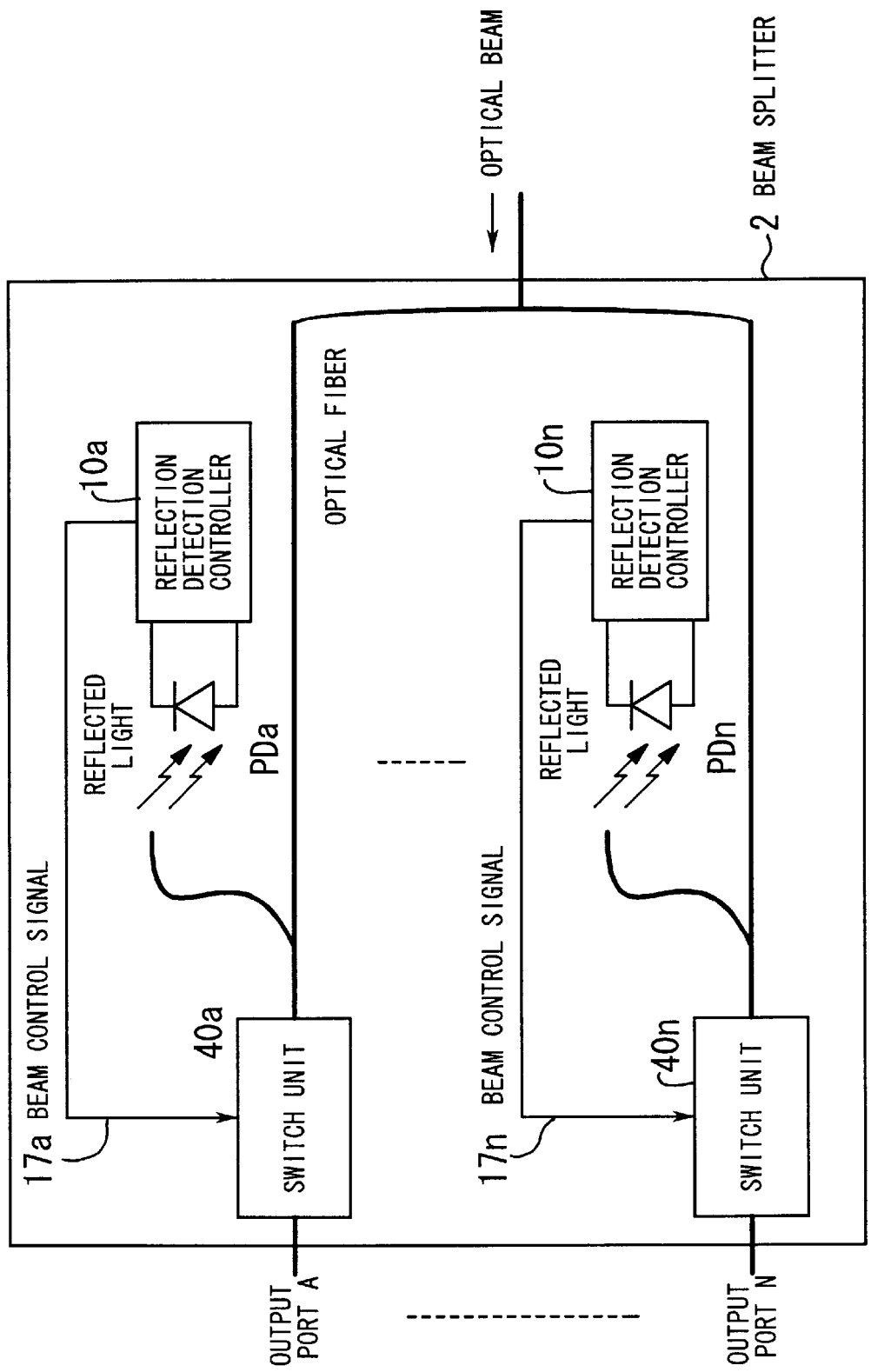
FIG. 8 is a block diagram of a second embodiment of the present invention.

Referring next to FIGS. 8 to 13, a second embodiment of the present invention will be explained below. FIG. 8 is a block diagram of a beam splitter 2 of the second embodiment. This beam splitter 2 is an optical component that divides a single input light beam into a plurality of beams and outputs them through their respective output ports A–N. If any of the output ports A–N has encountered a trouble such as a cable brake or plug disconnection, some part of the output light beam will reflect at the fiber end face that is left open. If such a trouble happened to the output port A, for instance, the reflected light reaches the photodiode PDa via the switch unit 40a.

The photodiode PDa transduces the reflected light into an electrical signal. The reflection detection controller 10a compares this electrical signal with a predetermined reference level. More specifically, if the voltage of the electrical signal exceeds the reference level, the reflection detection controller 10a will generate a beam control signal 17a indicative of the presence of a light reflection. On the other hand, if the voltage is not higher than the reference level, the reflected light is neglected and thus the beam control signal 17a stays inactive. Upon receipt of the beam control signal 17a, the switch unit 40a terminates the optical beam of the output port A from which the reflected light returned.

Figure 9:
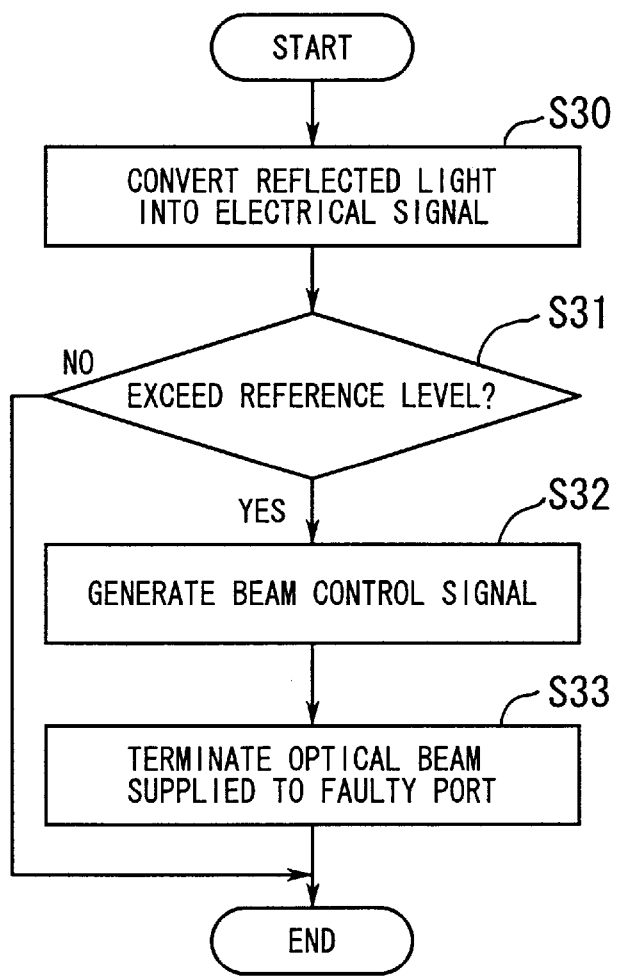
FIG. 9 is a flowchart showing an operation sequence of an optical beam splitting device of the second embodiment of the present invention.

The operation of this beam splitter 2 is represented in a flowchart of FIG. 9, where the output port A is assumed to be faulty.

[S30] The photodiode PDa receives a light beam reflected at a fiber end face and transduces it into an electrical signal.

[S31] The reflection detection controller 10a examines whether the voltage of the electrical signal exceeds a predetermined reference level or not. If it exceeds the reference level, the process advances to step S32. Otherwise, the process is terminated.

[S32] Having recognized the presence of the light reflection, the reflection detection controller 10a outputs a beam control signal 17a.

[S33] Upon receipt of the beam control signal 17a, the switch unit 40a terminates the optical beam of the output port A where the reflected light is observed.

Figure 10:
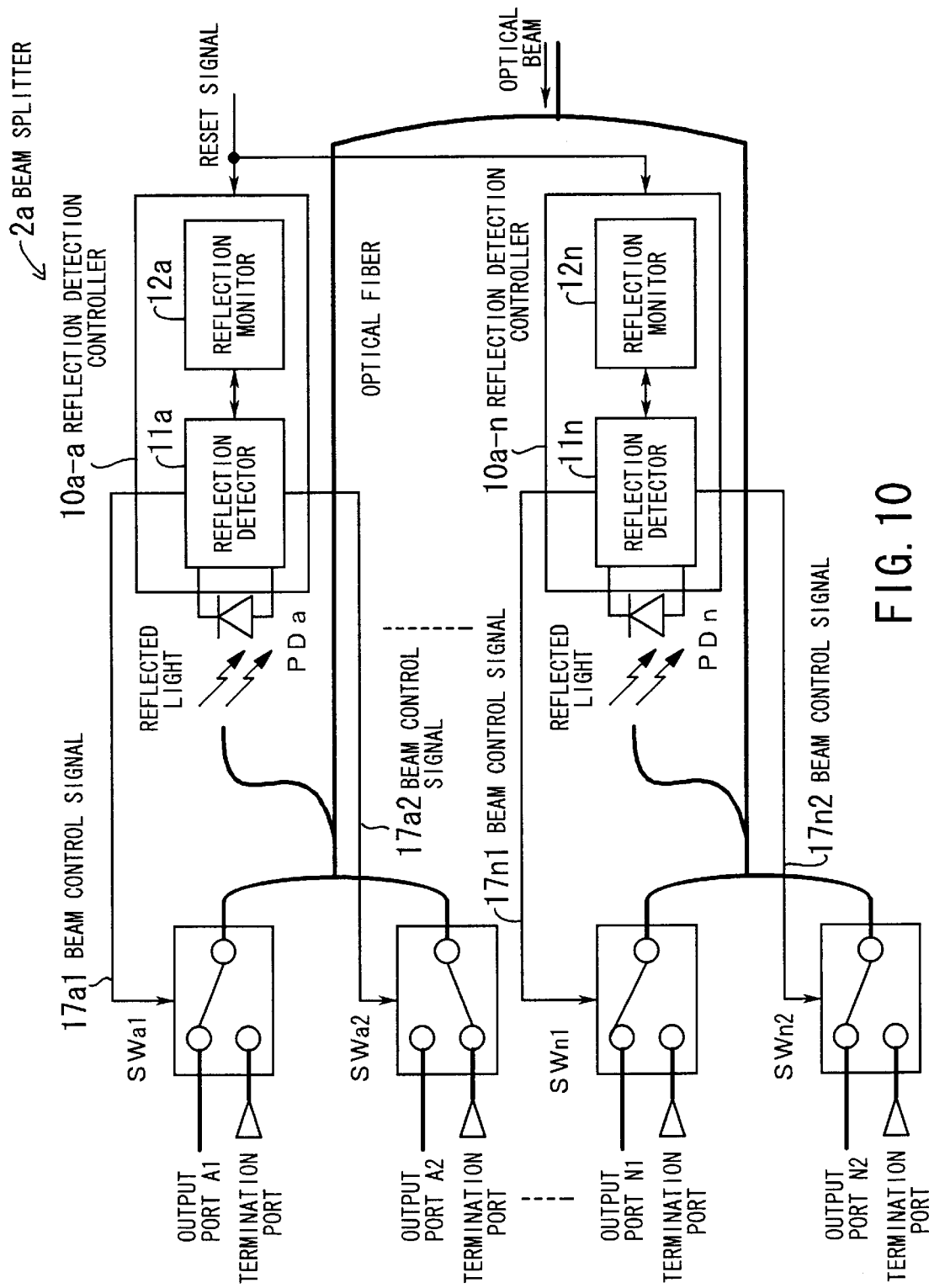
FIG. 10 is a block diagram showing a specific beam splitter of the second embodiment.

Referring next to FIG. 10, the following will present a specific structure of the second embodiment. FIG. 10 is a block diagram of a beam splitter 2a of the second embodiment, where switch units SWa1, SWa2, . . . SWn1, and SWn2 are disposed at the individual output ports A1, A2, . . . , N1, and N2. These switch units are double-throw optical switches, each of which leads its input light beam to either a corresponding output port or a termination port as will be described in detail later. For simplicity, the following explanation will focus on the portion related to the port A1 and A2, assuming that the port A2 has encountered a problem. The remaining portions would operate just similarly, if the same problem occurred to them.

When a cable break or plug disconnection occurred to an optical fiber cable extended from the port A2, the light reflected at the fiber end face comes back to the beam splitter 2a and reaches the photodiode PDa after passing through the switch unit SWa2. The photodiode PDa converts this reflected light to an electrical signal.

This electrical signal is entered to a reflection detection controller 10a-a comprising a reflection detector 11a and a reflection monitor 12a. The reflection detector 11a compares the voltage of the electrical signal with a predetermined reference voltage level, and if the voltage exceeds the reference level, it recognizes the presence of the light reflection and thus produces beam control signals 17a1 and 17a2. The beam control signals 17a1 and 17a2 are applied to the switch unit SWa1 and SWa2 to vary the optical beam intensity of the output ports A1 and A2, respectively.

The reflection monitor 12a watches the status of the back reflection detected by the photodiode PDa. Each time the switch units SWa1 and SWa2 respectively terminate the optical beams of the output ports A1 and A2, the reflection monitor 12a checks whether the reflection disappears or not, thereby determining which port is faulty. Now that the output port A2 has been determined as the faulty port, the reflection monitor 12a commands the reflection detector 11a to control the beam control signals 17a1 and 17a2 so that only the faulty port A2 will receive that signal. Since the beam control signal 17a1 is deactivated, the switch unit SWa1 returns to the normal state where the light beam is fully supplied to the output port A1. On the other hand, with the beam control signal 17a2 activated by the reflection detector 11a, the switch unit SWa2 connects the optical beam to the termination port.

When the problem of cable break or plug disconnection has been solved by a maintenance engineer, a reset signal can be entered from an external signal source to the reflection detection controller 10a-a. With respect to the functions of this reset signal, no further explanation will be presented here since it acts in the same way as described in the first embodiment.

Figure 11:
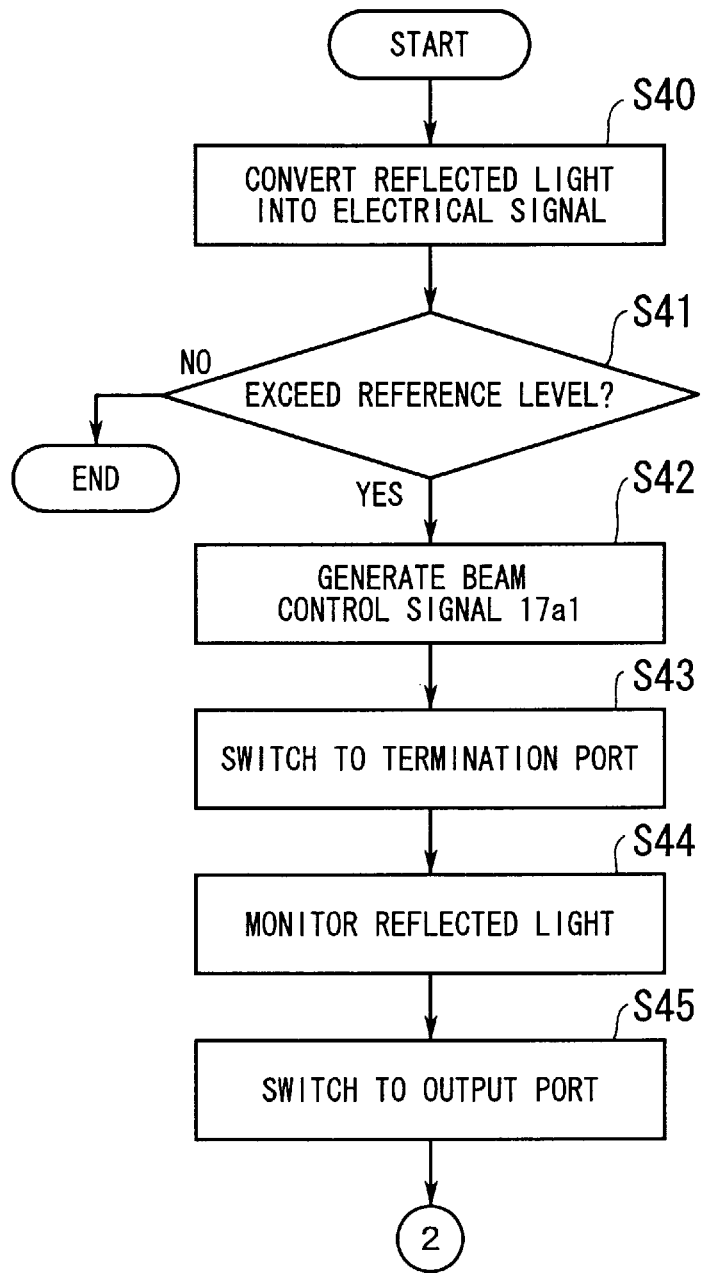
FIGS. 11 and 12 are flowcharts showing an operation sequence of the beam splitter of the second embodiment.
Figure 12:
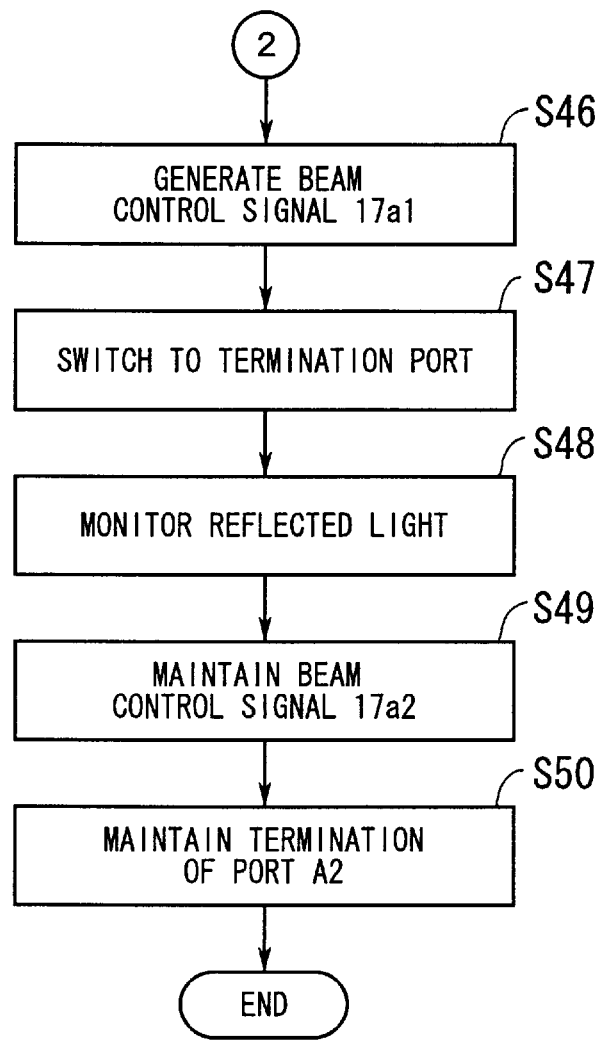

FIGS. 11 and 12 represent the operation of the beam splitter 2a in the form of a flowchart, assuming that the output port A2 is faulty. This process comprises the following steps, S40 to S50.

[S40] The photodiode PDa receives a light beam reflected at the end face of the optical fiber extending from the output port A2 and transduces it into an electrical signal.

[S41] The reflection detector 11a examines whether the voltage of the electrical signal exceeds a predetermined reference level or not. If it exceeds the reference level, the process advances to step S42. Otherwise, the process is terminated.

[S42] Having recognized the presence of the back reflection, the reflection detection controller 10a generates a beam control signal 17a1.

[S43] With the beam control signal 17a1 activated by the reflection detector 11a, the switch unit SWa1 switches the optical beam to the termination port, thereby disabling the output port A1.

[S44] The reflection monitor 12a checks whether the reflection has disappeared or not. Because the reflected light from the output port A2 is still alive in this case, the reflection detector 11a continually observes the back reflection even if the output port A1 is disabled. Therefore, the reflection monitor 12a determines that the output port A1 is functioning normally.

[S45] The reflection monitor 12a directs the reflection detector 11a to negate the beam control signal 17a1. This makes the switch unit SWa1 return to the normal state, allowing the light beam to be delivered to the output port A1 again.

[S46] The reflection detector 11a then activates another beam control signal 17a2.

[S47] With the beam control signal 17a2 activated by the reflection detector 11a, the switch unit SWa2 switches the optical beam to the termination port.

[S48] The reflection monitor 12a checks whether the reflection has disappeared or not. Recall that the output port A2 is the origin of the reflected light in this example. However, once the optical beam is terminated before reaching the output port A2, the reflection is no longer observed by the reflection detector 11a. Accordingly, the reflection monitor 12a determines that the output port A2 is faulty.

[S49] The reflection monitor 12a controls the reflection detector 11a to keep the present setting of the beam control signals 17a1 and 17a2 by which only the switch unit SWa2 for the faulty port A2 is activated.

[S50] Based on the beam control signal 17a2 being solely activated, the switch unit SWa2 maintains the connection to the termination port to prevent the light beam from being delivered to the faulty port A2.

Figure 13:
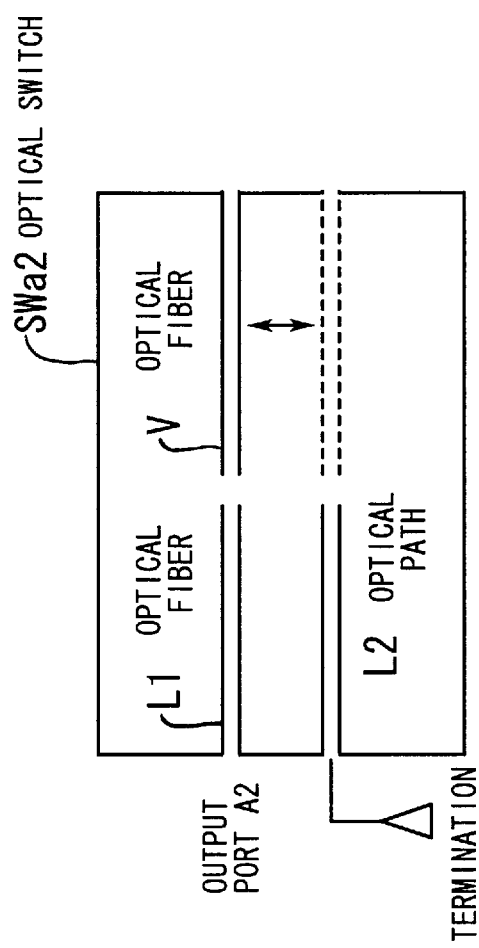
FIG. 13 is a diagram showing a typical internal structure of a switch unit used in the second embodiment.

Next, the following description will explain the internal structure of the switch units. FIG. 13 schematically shows an internal structure of the switch unit SWa2. As illustrated, there are two optical paths formed inside the switch unit SWa2; one fixed optical fiber L1 leads to the output port A2, while the other optical path L2 to the termination port. A movable optical fiber V conveys the source optical beam. The switch unit SWa2 is a mechanically actuated optical switch that changes the internal optical path connections by moving the end of the optical fiber V. When the output port A2 is determined as being faulty and thus the beam control signal 17a2 is activated, the optical fiber V is moved to another position indicated by the broken lines. That is, the end face of the optical fiber V leaves the fixed optical fiber L1 and couples with the optical path L2 leading to the termination port. When the beam control signal 17a2 is negated, the optical fiber V returns to the original position to regain coupling with the optical fiber L1.

As described above, the beam splitter 2a of the second embodiment produces beam control signals by transducing a reflected light beam into an electrical signal, controls the switch units according to the beam control signals, and terminates the faulty port. Since the switch unit control is applied on a port-by-port basis, normal ports can continue to operate while the faulty port is closed. Therefore, the optical communications network can maintain its quality of service.

Figure 14:
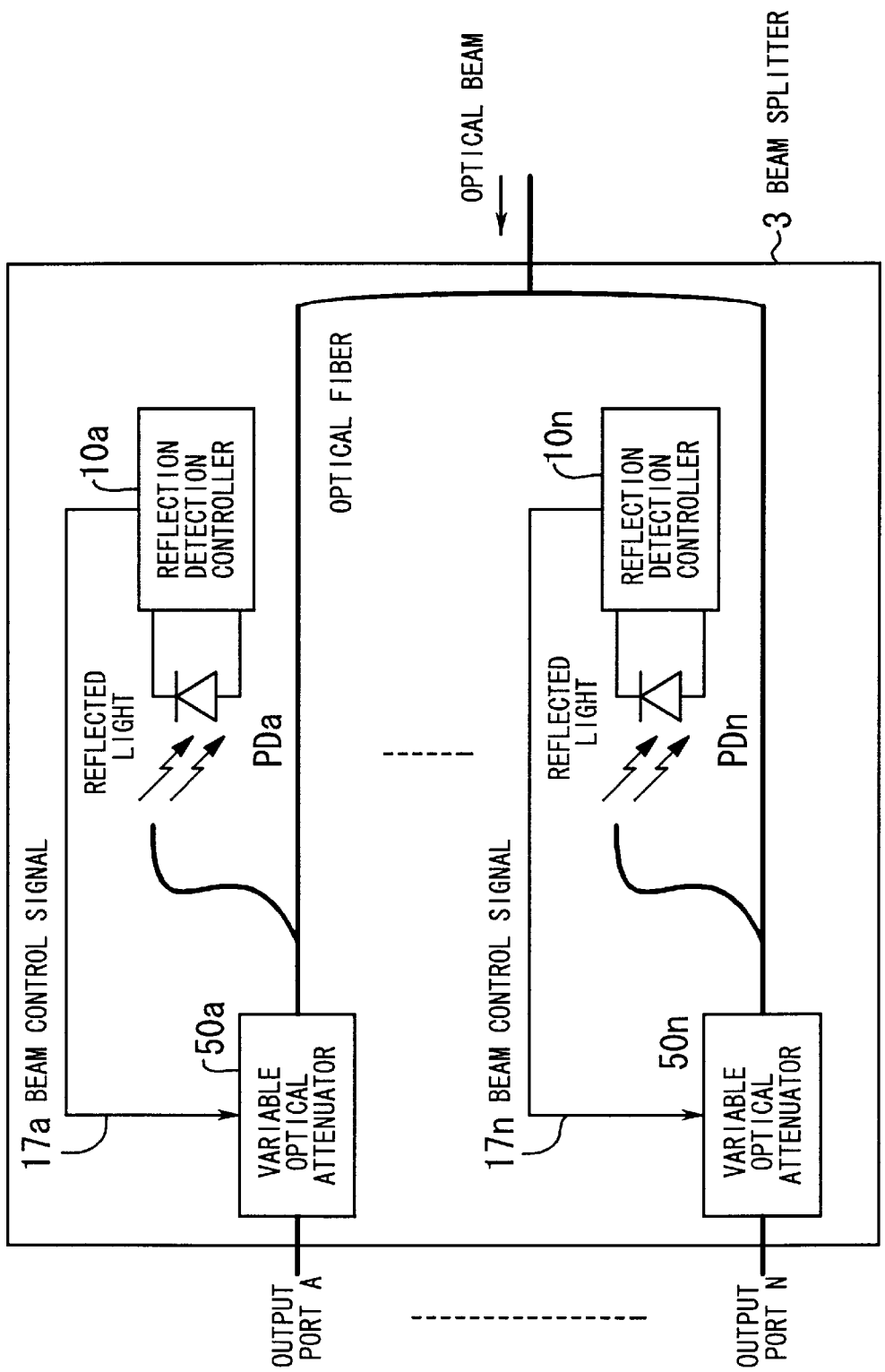
FIG. 14 is a block diagram showing a third embodiment of the present invention.

Referring next to FIGS. 14 to 17, the following will present a third embodiment of the present invention. FIG. 14 is a block diagram of a beam splitter 3 of the third embodiment, which is distinguishable from the first embodiment in that it comprises variable optical attenuators 50a–50n as opposed to the external modulators 20a–20n. This beam splitter 3 is an optical component that divides a single input light beam into a plurality of beams and outputs them through their respective output ports A to N. If any of the optical fiber cables extending from the output ports A–N encountered a trouble such as a cable brake or plug disconnection, a fraction of the output optical beam will be reflected at the open end face of the optical fiber. Suppose that such a trouble has happened to the output port A, for example. The reflected light is fed to an optical sensing device, i.e., the photodiode PDa, via the variable optical attenuator 50a.

The photodiode PDa transduces the reflected light into an electrical signal, and the reflection detection controller 10a compares this electrical signal with a predetermined reference level. If the voltage of the electrical signal exceeds the reference level, the reflection detection controller 10a will generate a beam control signal 17a that indicates the presence of a meaningful light reflection. On the other hand, if the voltage is not higher than the reference level, the reflected light is neglected and thus the beam control signal 17a stays inactive. Upon receipt of the beam control signal 17a, the variable optical attenuator 50a reduces the intensity of the light beam supplied to the output port A where the reflected light was observed.

Figure 15:
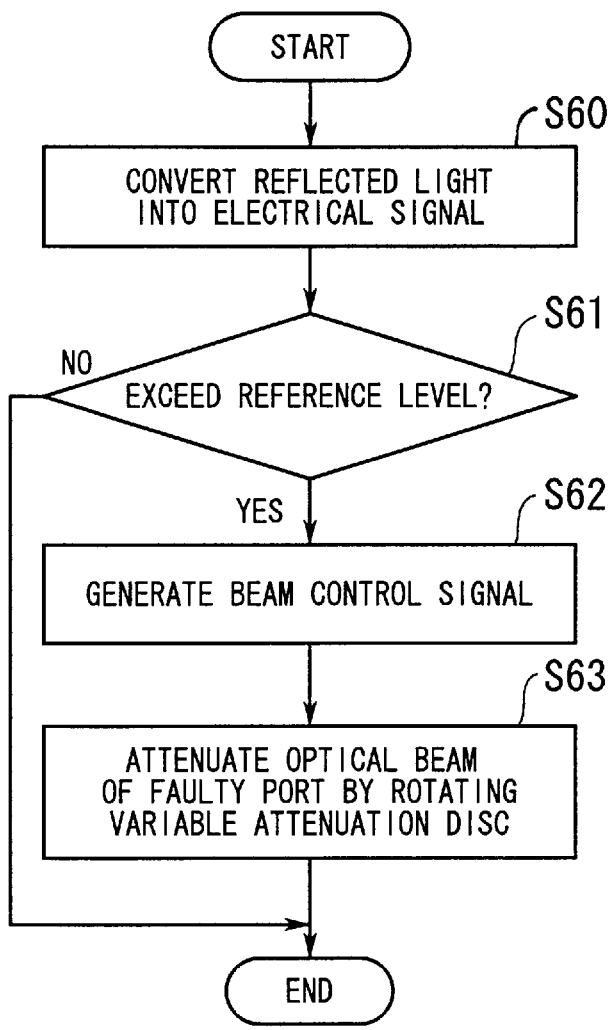
FIG. 15 is a flowchart showing an operation sequence of a beam splitter of the third embodiment.

FIG. 15 represents the operation of the beam splitter 3 in the form of a flowchart, where the output port A is assumed to be faulty. The process comprises the following steps S60 to S63.

[S60] The photodiode PDa receives a light beam reflected at a fiber end face and transduces it into an electrical signal.

[S61] The reflection detection controller 10a examines whether the voltage of the electrical signal exceeds a predetermined reference level or not. If it exceeds the reference level, the process advances to step S62. Otherwise, the process is terminated.

[S62] Having recognized the presence of the light reflection, the reflection detection controller 10a outputs a beam control signal 17a.

[S63] Upon receipt of the beam control signal 17a, the variable optical attenuator 50a reduces the intensity of the light beam supplied to the output port A where the reflected light was observed. The variable optical attenuator 50a achieves this by rotating an internal attenuation disc according to the beam control signal 17a as will be described in detail later.

Figure 16:
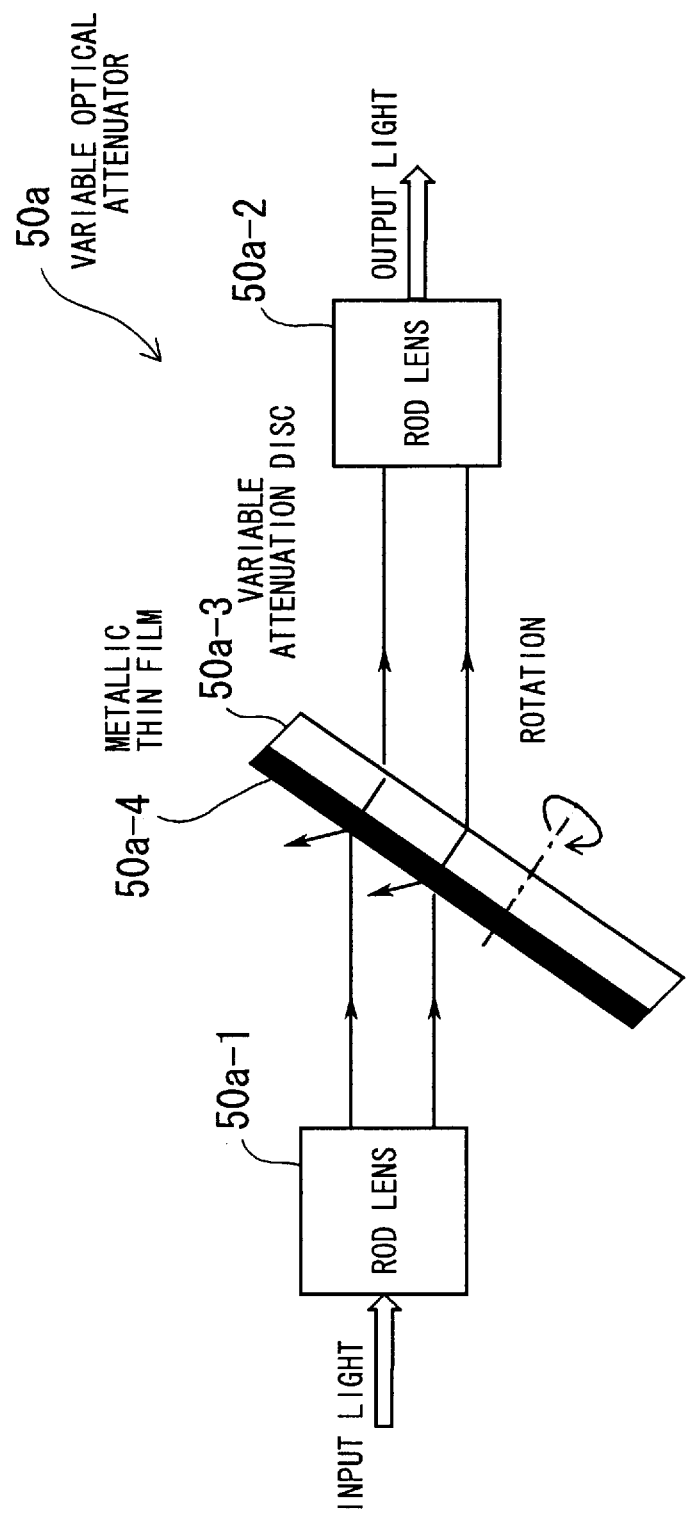
FIG. 16 is a diagram showing a typical internal structure of a variable optical attenuator used in the third embodiment.

Next, the following description will explain the internal structure of the variable optical attenuator 50a. FIG. 16 shows a typical internal structure of the variable optical attenuator 50a, which comprises first and second rod lenses 50a-1 and 50a-2 and a variable attenuation disc 50a-3.

The incoming light beam supplied through an input optical fiber (not shown in FIG. 16) is reshaped into a wider parallel light beam by the first rod lens 50a-1 and projected to the surface of the variable attenuation disc 50a-3 that is placed in an oblique direction. While some part of this incident light beam is reflected or absorbed by the variable attenuation disc 50a-3, the transmitted light is collected by the second rod lens 50a-2 and introduced into an output optical fiber (not shown in FIG. 16). The variable attenuation disc 50a-3 has a metallic thin film deposited on its surface for attenuation purposes. Since the thickness of the thin film is continuously varied in the angular direction, the variable optical attenuator 50a can provide various attenuation ratios by rotating the variable attenuation disc 50a-3.

As described above, the beam splitter 3 of the third embodiment produces a beam control signal by transducing a reflected light to an electrical signal, and according to this beam control signal, it controls a relevant variable optical attenuator to reduce the output power level of the faulty output port. Since the output control is applied on a port-by-port basis, normal ports can continue to operate while the faulty port is closed. Therefore, the optical communications network can maintain its quality of service.

Figure 17:
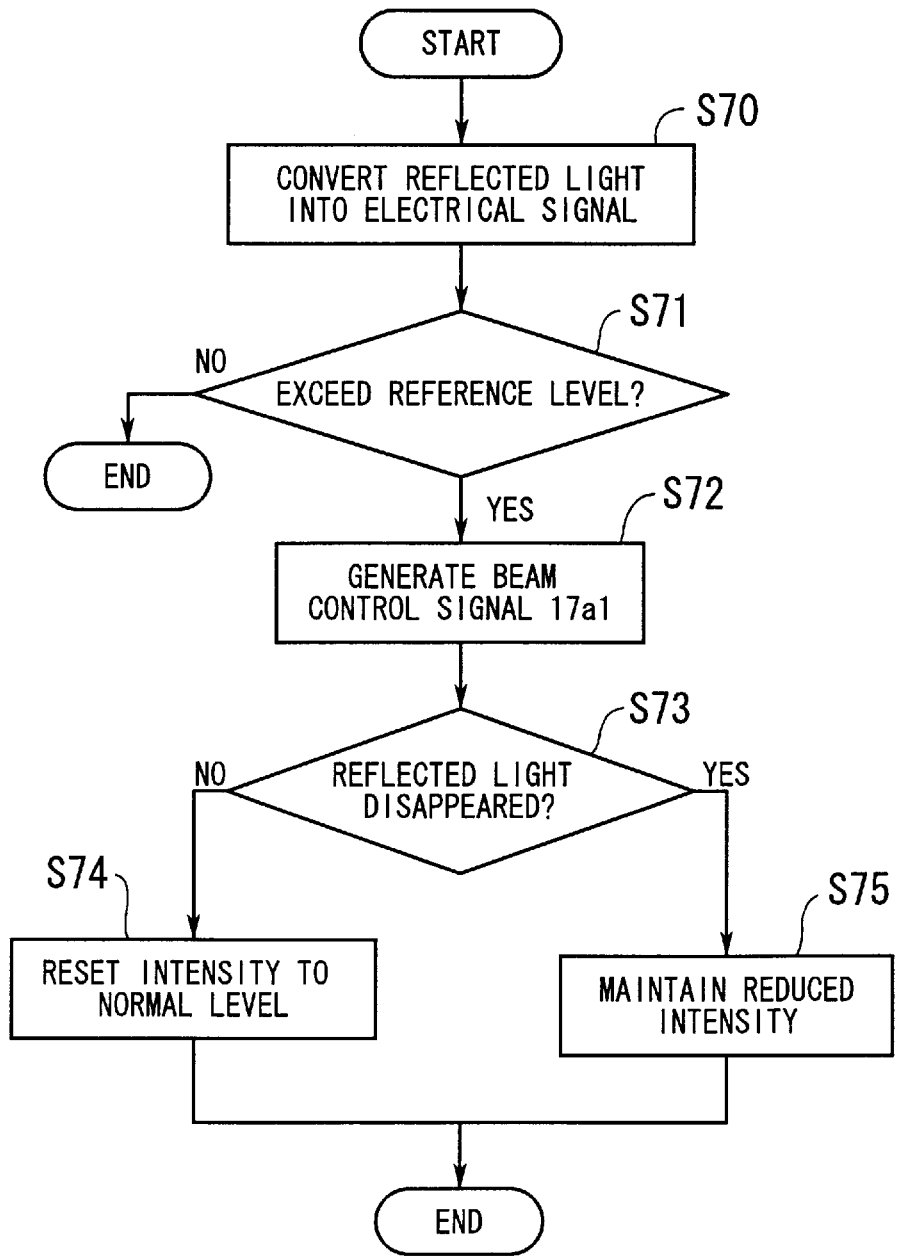
FIG. 17 is a flowchart showing an output control method for an optical beam splitting device according to the present invention.
Figure 18:
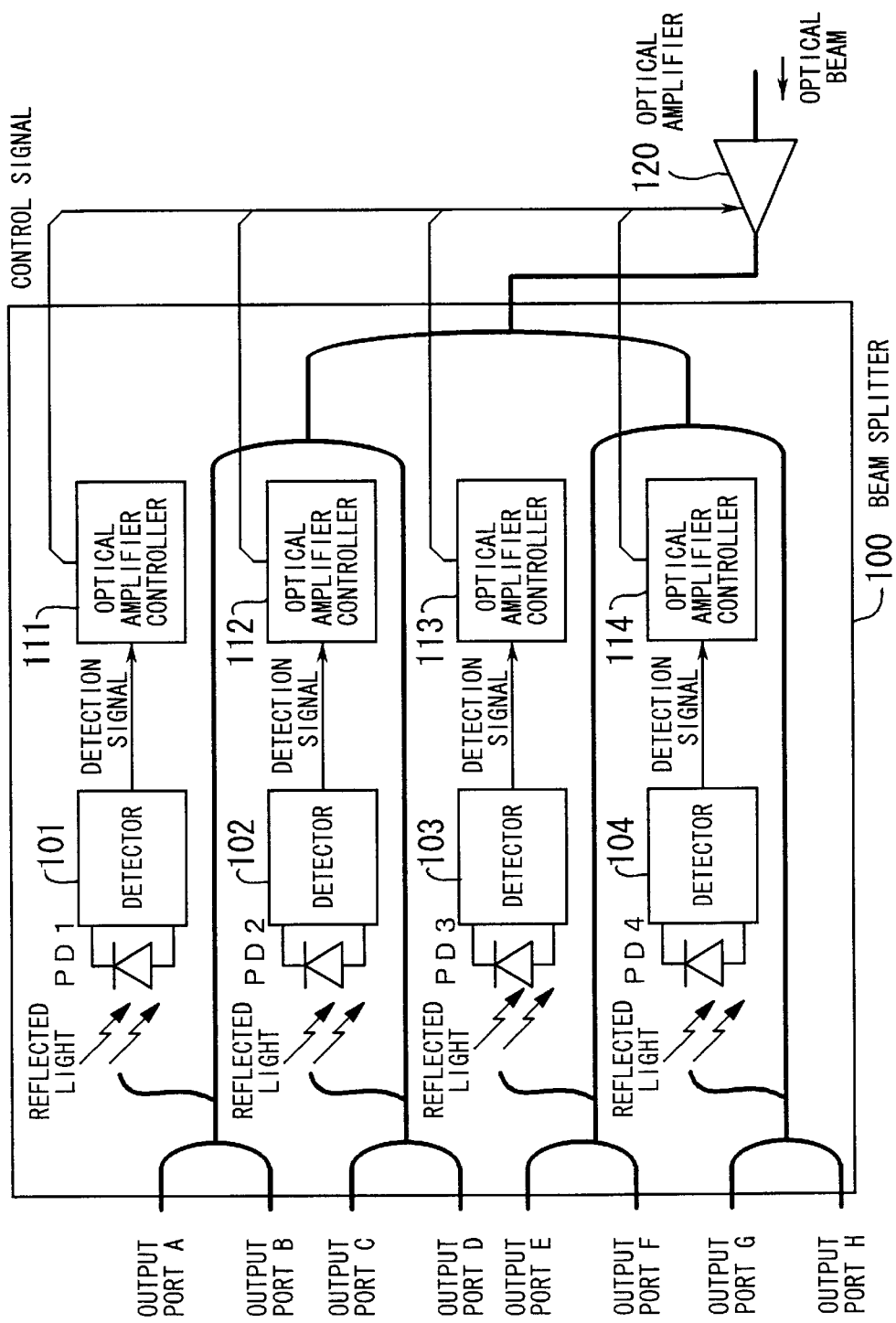
FIG. 18 is a block diagram of a beam splitter that is equipped with a conventional output control function.

Referring next to FIG. 17, the following description will explain the output control method for an optical beam splitter according to the present invention. FIG. 17 is a flowchart showing a procedure of the output control method, which comprises the following steps, S70 to S73.

[S70] Receive a light beam reflected at the end face of the optical fiber and transduce it into an electrical signal.

[S71] Examine whether the electrical signal exceeds a predetermined reference level or not. If it exceeds the reference level, the process advances to step S72. Otherwise, the process is terminated.

[S72] Upon recognition of the presence of the light reflection, generate a beam control signal to the relevant port.

[S73] Based on the beam control signal, reduce the intensity of the light beam and check whether the reflection disappears or not. If the reflection still exists, the process advances to step S74. If it has disappeared, the process proceeds to step S75.

[S74] Reset the intensity of the light beam of the output port so that the normal power level will be regained.

[S75] Maintain the optical beam output at the reduced power level.

In summary, the optical beam splitting device and the output beam control method of the present invention produce beam control signals by transducing a reflected light beam into an electrical signal, reduce the power level of the output ports according to the beam control signals, and determine the faulty port if the reflection has disappeared as a result of the power reduction. Since the output control is applied on an individual port basis, normal ports can continue to operate while the faulty port is closed. Therefore, the optical communications network can maintain its quality of service.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical beam splitting device for dividing an input optical beam into a plurality of optical beams and outputting the plurality of optical beams through output ports assigned thereto, comprising:

an optical sensing device for receiving a reflected light that is reflected at a fiber end face and returns through one of the output ports, and converting the reflected light into an electrical signal;

a reflection detection controller for detecting the reflected light by examining whether the electrical signal exceeds a predetermined reference level or not, and generating a beam control signal upon detection of the reflected light; and an external modulator, responsive to the beam control signal, for reducing intensity of the optical beam that is supplied to the output port through which the reflected light has returned.

2. The optical beam splitting device according to claim 1, wherein said reflection detection controller stops generating the beam control signal in response to a reset signal received from an external signal source, thereby returning the intensity of the optical beam to a normal state thereof.

3. The optical beam splitting device according to claim 1, wherein said external modulator reduces the intensity of the optical beams supplied to two or more output ports, and said reflection detection controller sequentially generates a plurality of beam control signals corresponding to the individual output ports under the intensity control of said external modulator.

4. The optical beam splitting device according to claim 3, wherein said external modulator reduces the intensity of the optical beams supplied to the two or more output ports on an individual port basis, in response to the plurality of beam control signals sequentially generated by said reflection detection controller.

5. The optical beam splitting device according to claim 4, wherein said reflection detection controller comprises a reflection monitor for determining a faulty output port by monitoring the electrical signal from said optical sensing device to examine whether the reflected light disappears or not, each time said external modulator reduces the intensity of the optical beams on an individual port basis.

6. The optical beam splitting device according to claim 5, further comprising a port failure communication controller for informing an external alarm device of the faulty output port determined by said reflection monitor.

7. An optical beam splitting device for dividing an input optical beam into a plurality of optical beams and outputting the plurality of optical beams through output ports assigned thereto, comprising:

an optical sensing device for receiving a reflected light that is reflected at a fiber end face and returns through one of the output ports, and converting the reflected light into an electrical signal;

a reflection detection controller for detecting the reflected light by examining whether the electrical signal exceeds a predetermined reference level or not, and generating a beam control signal upon detection of the reflected light; and a switch unit, responsive to the beam control signal, for terminating the optical beam for the output port through which the reflected light has returned, whereby said output port is disabled.

8. An optical beam splitting device for dividing an input optical beam into a plurality of optical beams and outputting the plurality of optical beams through output ports assigned thereto, comprising:

an optical sensing device for receiving a reflected light that is reflected at a fiber end face and returns through one of the output ports, and converting the reflected light into an electrical signal;

a reflection detection controller for detecting the reflected light by examining whether the electrical signal exceeds a predetermined reference level or not, and generating a beam control signal upon detection of the reflected light; and a variable optical attenuator, responsive to the beam control signal, for attenuating the optical beam that is supplied to the output port through which the reflected light has returned.

9. A method of controlling optical beams produced by an optical beam splitter that divides an input optical beam into a plurality of optical beams and outputs the plurality of optical beams through output ports assigned thereto, the method comprising the steps of:

(a) converting a reflected light into an electrical signal, wherein the reflected light is reflected at a fiber end face and returns through one of the output ports;

(b) detecting the reflected light by examining whether the electrical signal exceeds a predetermined reference level or not;

(c) generating beam control signals for the individual output ports upon detection of the reflected light;

(d) in response to the beam control signals, reducing power level of the optical beam for each output port to examine whether the reflected light disappears or not; and (e) restoring the optical beam for the output port if the reflection light is alive, and maintaining the optical beam with the reduced power level if the reflected light disappeared in said step (d) of reducing the optical beam.

* * * * *